(12) United States Patent
Mayer et al.

(10) Patent No.: US 6,945,611 B2
(45) Date of Patent: Sep. 20, 2005

(54) BRAKING SYSTEM FOR VEHICLE PROVIDED WITH ABS OR AN ANTI-SKID PROTECTION SYSTEM

(75) Inventors: Reinhold Mayer, Karlsfeld (DE); Ralf Schmid, Vaterstetten (DE)

(73) Assignee: Knorr-Bremse Systeme Fur Schienenfahrzeuge GmbH, Munich (DE)

( * ) Notice: Subject to any disclaimer, the term of this patent is extended or adjusted under 35 U.S.C. 154(b) by 0 days.

(21) Appl. No.: 10/296,913

(22) PCT Filed: May 30, 2001

(86) PCT No.: PCT/EP01/06139

§ 371 (c)(1),
(2), (4) Date: Nov. 27, 2002

(87) PCT Pub. No.: WO01/92077

PCT Pub. Date: Dec. 6, 2001

(65) Prior Publication Data

US 2004/0041465 A1 Mar. 4, 2004

(30) Foreign Application Priority Data

May 30, 2000 (DE) ......................................... 100 26 685

(51) Int. Cl.[7] ................................................. B60T 8/88
(52) U.S. Cl. .............................. 303/122.06; 303/DIG. 9
(58) Field of Search ........................... 303/122.06, 170, 303/171, 172, 173, 167, 20, DIG. 9, 138

(56) References Cited

U.S. PATENT DOCUMENTS

| 4,969,101 A | 11/1990 | Matsuda |
| 5,015,042 A | 5/1991 | Yoshino |
| 5,299,131 A | 3/1994 | Haas et al. |
| 5,456,641 A | 10/1995 | Sawase |
| 5,476,311 A | 12/1995 | Fennel et al. |
| 5,729,476 A | 3/1998 | Pfau |
| 5,791,744 A | 8/1998 | Wood et al. |
| 5,944,393 A | 8/1999 | Sano |
| 5,992,951 A | 11/1999 | Naito et al. |
| 6,026,343 A | 2/2000 | Ogino |
| 6,112,146 A | 8/2000 | Mueller |
| 6,142,587 A | 11/2000 | Ohtsu et al. |
| 6,163,742 A | 12/2000 | Shimizu |
| 6,246,946 B1 | 6/2001 | Ohtsu |

FOREIGN PATENT DOCUMENTS

| DE | 34 41 103 A1 | 5/1986 |
| DE | 37 38 914 A1 | 5/1989 |
| DE | 39 25 829 A1 | 2/1991 |
| DE | 39 31 313 A1 | 3/1991 |
| DE | 44 44 408 A1 | 6/1996 |
| DE | 198 26 131 A1 | 12/1999 |
| DE | 199 30 561 A1 | 1/2000 |
| DE | 199 53 865 A1 | 5/2000 |
| EP | 0 276 818 A2 | 8/1988 |
| JP | 361155049 A | 7/1986 |
| JP | 401275253 A | 11/1989 |
| JP | 403061154 A | 3/1991 |
| JP | 403197263 A | 8/1991 |
| JP | 404173462 A | 6/1992 |
| JP | 406144187 A | 5/1994 |
| JP | 408188139 A | 7/1996 |
| JP | 409193777 A | 7/1997 |

*Primary Examiner*—Xuan Lan Nguyen
(74) *Attorney, Agent, or Firm*—Barnes & Thornburg LLP

(57) ABSTRACT

The general principle underlying the invention is a braking system that is provided with an arithmetic unit with at least two independent channels for determining the reference speeds approximated to the actual vehicle speed. The at least two determined reference speeds are used only for regulating a part of the brakes installed in the vehicle.

4 Claims, 10 Drawing Sheets

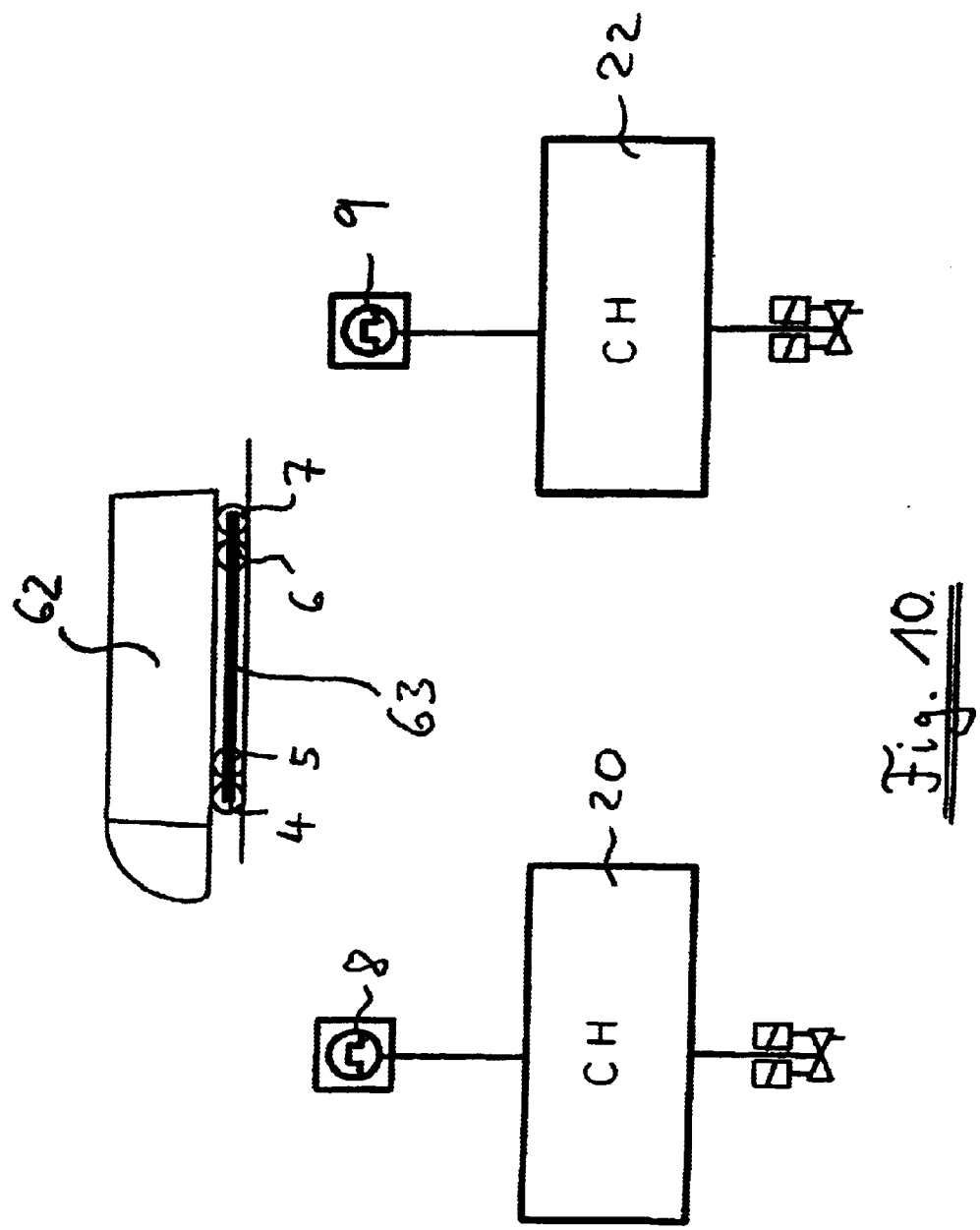

BRAKING SYSTEM FOR VEHICLE PROVIDED WITH ABS OR AN ANTI-SKID PROTECTION SYSTEM

BACKGROUND AND SUMMARY OF THE INVENTION

The present invention relates to a braking system for vehicles equipped with an ABS system or an antiskid protection system.

An antilock system for a motorcycle is known from German Patent Document 39 31 313 A1, in which a total of only two rotational wheel speed sensors are provided, one sensor being assigned to the front wheel and the other being assigned to the rear wheel. For determining the wheel slip, a reference quantity is determined which is approximated to the course of the vehicle speed and in which case two channels are provided. The two reference speeds are determined on the basis of the assigned wheel speed and a multiplier dependent on the driving condition.

U.S. Patent Document U.S. Pat. No. 5,791,744 A describes an electropneumatic braking system for rail vehicles, in which a "universal unit" is assigned to each car and controls the brakes of the respective car. Such a universal unit consists of an electronic portion, a pneumatic portion and an electropneumatic portion. The electronic portion has, among other things, an interface for rotational wheel speed sensors.

German Patent Document DE 198 26 131 A1 describes an electric braking system for a motor vehicle in which two electronic arithmetic channels are provided. In the case of this braking system, among other values, slip values are computed individually for the each wheel. The rotational wheel speed of the respective wheel and a centrally computed estimated value for the vehicle speed are entered into the computation of the slip, the vehicle speed being computed in a single-channel manner, that is, not redundantly.

Modern road and rail vehicles are normally equipped with an antilock system which, in the case of road vehicles, is called an "ABS system" and, in the case of rail vehicles, is called an "antiskid protection system". ABS systems and antiskid protection systems control the brake pressures at individual wheels or axles of the vehicle such that a locking of the wheels or wheel sets is prevented and the length of the braking path is minimized. For such a brake pressure control, the slip values which exist at the individual wheels or axles are required and are determined from the respective wheel speeds and the actual vehicle speed. For this purpose, rotational wheel speed sensors are normally provided. In which case, an approximate value for the actual vehicle speed, that is, a "reference speed", is determined from the individual rotational wheel speeds. When the measured rotational wheel speed signals are faulty, for example, as a result of electromagnetic interference fields and/or system-caused measuring errors, which result in "peaks" in the speed course or acceleration course of the measuring signals, errors may then also occur when computing the reference speed.

A "false" reference speed may result in errors in controlling the braking force of the entire vehicle. This is problematic particularly in the case of those vehicles which only have an independent system for the braking force control.

The reason is that ABS systems or antiskid protection systems normally have a single-channel construction; that is, the rotational wheel speeds are detected in a single-channel manner. If one rotational wheel speed sensor fails, the assigned wheels can no longer be controlled corresponding to the existing rotational wheel speed.

To prevent faulty rotational wheel speed signals from falsifying the reference speed value, conventional algorithms for computing the reference speed have a "detection" of faulty signals, but a reliable detection of all possible faults requires very high expenditures. In addition, faults may have an effect on the calculation of the reference speed already during the fault disclosure time such that the braking force control is affected.

It is an object of the invention to provide a braking system which is optimized with respect to the determination of the actual vehicle speed required for an ABS or antiskid protection control. This object is achieved by the present invention.

The basic principle of the invention consists of a braking system with an arithmetic unit which has at least two separate "channels", in which, independently of one another, a "reference speed" is determined which is approximated to the actual vehicle speed. The at least two reference speeds are in each case used only for controlling a portion of the brakes in the vehicle.

The separate computation of the reference speeds can take place in a brake control unit or in an arithmetic unit. Only a portion of the rotational wheel speed sensors in the vehicle, as well as a portion of the brakes in the vehicle, are assigned to each of the channels. On each channel, rotational wheel speed signals of different sensors are used for computing one reference speed respectively. Consequently, in the case of two channels, maximally half the brakes in the vehicle are controlled on the basis of one of the two reference speeds. Even when only one arithmetic unit, that is, one brake control unit, is provided, an error occurring in the detection of the rotational wheel speed may have an effect on maximally half of the brakes. An individual fault in the speed detection can therefore not influence the entire braking force of the vehicle.

In the "redundant" detection of the rotational wheel speed, at least two rotational wheel speed signals of a wheel or of a wheel group are always included in the control. The wheel or the wheel group can therefore still be controlled when one of the two rotational wheel speed signals fails or has interference. This significantly improves the driving safety.

According to a further development of the invention, for a vehicle or in the case of several vehicle units coupled to one another, including at least one front axle and one rear axle, at least one front axle signal and one rear axle signal is analyzed on each channel. Thus, at least one rotational wheel speed sensor of a front axle and one rotational wheel speed sensor of a rear axle is connected to each channel. The first channel can therefore be used, for example, for the braking force control of the front axle or front axle group, and the second channel can be used for the braking pressure control of the rear axle or the rear axle group.

According to a further development of the invention, a control unit is provided for the plausibility check of the rotational wheel speed signals supplied by the rotational wheel speed sensors. The rotational wheel speed signals are checked particularly with respect to "signal peaks" which are based on interference. In the control unit, an analyzing algorithm is implemented which recognizes "faulty" rotational wheel speed signals and optionally excludes them for calculating the reference speed. All detected rotational wheel speed signals can be analyzed in a common arithmetic unit, can be compared with one another and can be checked with respect to plausibility. This permits the detection of "implausible" or "disturbed" rotational wheel speed signals and therefore increases the safety of the entire braking system.

The invention can be implemented at very reasonable cost because only one arithmetic unit or only one brake control unit is required. It can be used in the case of passenger cars, trucks, motor bikes as well as in the case of rail vehicles or trains.

These and other aspects of the present invention will become apparent from the following detailed description of the invention, when considered in conjunction with accompanying drawings.

BRIEF DESCRIPTION OF THE DRAWINGS

FIG. 10 is a schematic view of an embodiment of a traction vehicle with kinematically coupled axles.

DETAILED DESCRIPTION OF THE PREFERRED EMBODIMENTS

Figure 1:
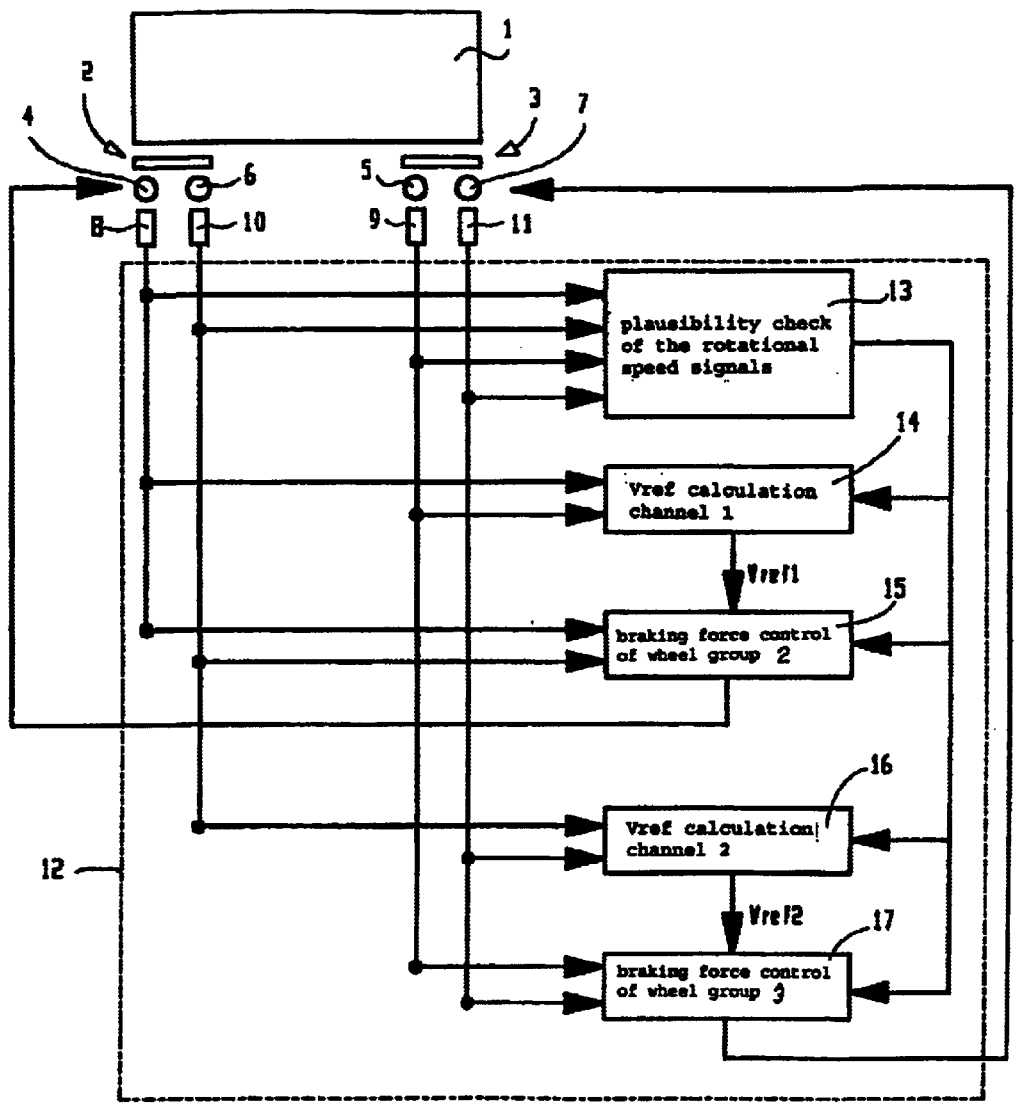
FIG. 1 is a schematic view of a first embodiment for explaining the basic principle of the invention.

FIG. 1 illustrates a vehicle 1 with a first wheel group 2 and a second wheel group 3. The two wheel groups 2, 3 may, for example, be bogies of a rail vehicle and each has a first axle 4, 5 and a second axle 6,7 respectively. One rotational wheel speed sensor 8–11 respectively is assigned to the axles 4–7.

The rotational wheel speed sensors 8–11 are connected with a brake control unit 12 which is shown here only schematically. In the brake control unit 12, a plausibility check 13 is implemented which is to detect faulty or "disturbed" rotational wheel speed signals and optionally separate them.

The brake control unit 12 also has two channels for the separate or independent calculation of one reference speed respectively approximated to the actual vehicle speed. Brakes (not shown) provided in the vehicle are assigned to a first or to a second group. Here, the first group is formed by the brakes of the first wheel group 2, and the second group is formed by the brakes of the second wheel group 3. The brakes of the first wheel group 2 are controlled by a first channel of the brake control unit 12, and the brakes of the second wheel group 3 are controlled by a second channel of the brake control unit 12.

On the first channel, the rotational wheel speed signals are analyzed which are supplied by the rotational wheel speed sensors 8, 9. If the plausibility check 13 indicates that the signal supplied by the rotational wheel speed sensors 8, 9 are plausible, both signals are entered into the reference speed calculation 14 of the first channel.

In the reference speed calculation 14, for example, both signals supplied by the rotational wheel speed sensors 8, 9 can be linked with one another to form a first reference speed $V_{ref1}$. However, during a braking operation, it may also make sense to consider the greater of the speeds measured by the rotational wheel speed sensors 8, 9 as the $V_{ref1}$. If the vehicle 1 is a traction vehicle and is just being accelerated, it may, in contrast, make sense to accept the lower of the two speeds measured by the rotational wheel speed sensors 8, 9 as the reference speed $V_{ref1}$.

The reference speed $V_{ref1}$ determined by calculation 14 on the basis of rotational wheel speed signals of the first wheel group 2 and of the second wheel group 3 is used for the braking force control 15 of the first wheel group 2. The rotational wheel speed signals supplied by the rotational wheel speed sensors 8, 10 of the first wheel group 2 are entered into the "braking force control" 15.

Furthermore, the results of the plausibility check 13 are taken into account during the braking force control 15. If the signals supplied by the rotational wheel speed sensors 8, 10 are considered plausible, they can both be taken into account. Otherwise, a possibly faulty signal does not have to be considered.

The second channel is provided for the braking force control of the second wheel group 3. On channel 2, a reference speed calculation 16 is carried out using the signals supplied by the rotational wheel speed sensors 10, 11 analogous to channel 1. The results of the plausibility check 13 are also taken into account. On the basis of the determined reference speed $V_{ref2}$ by calculation 16, control signals are generated for a braking force control 17. During the braking force control 17, the signals supplied by the rotational wheel speed sensors 9, 11 as well as the results of the plausibility check 13 are analyzed.

An important advantage of the invention consists of the fact that a fault or an interference on one of the two channels can affect maximally half of the brakes in the vehicle 1. If, for example, one of the two channels fails completely, the brakes of the other channel continue to be controllable. As an alternative to the embodiment illustrated here, more than two channels may also be provided, which further improves the fail-safe characteristic.

Figure 2:
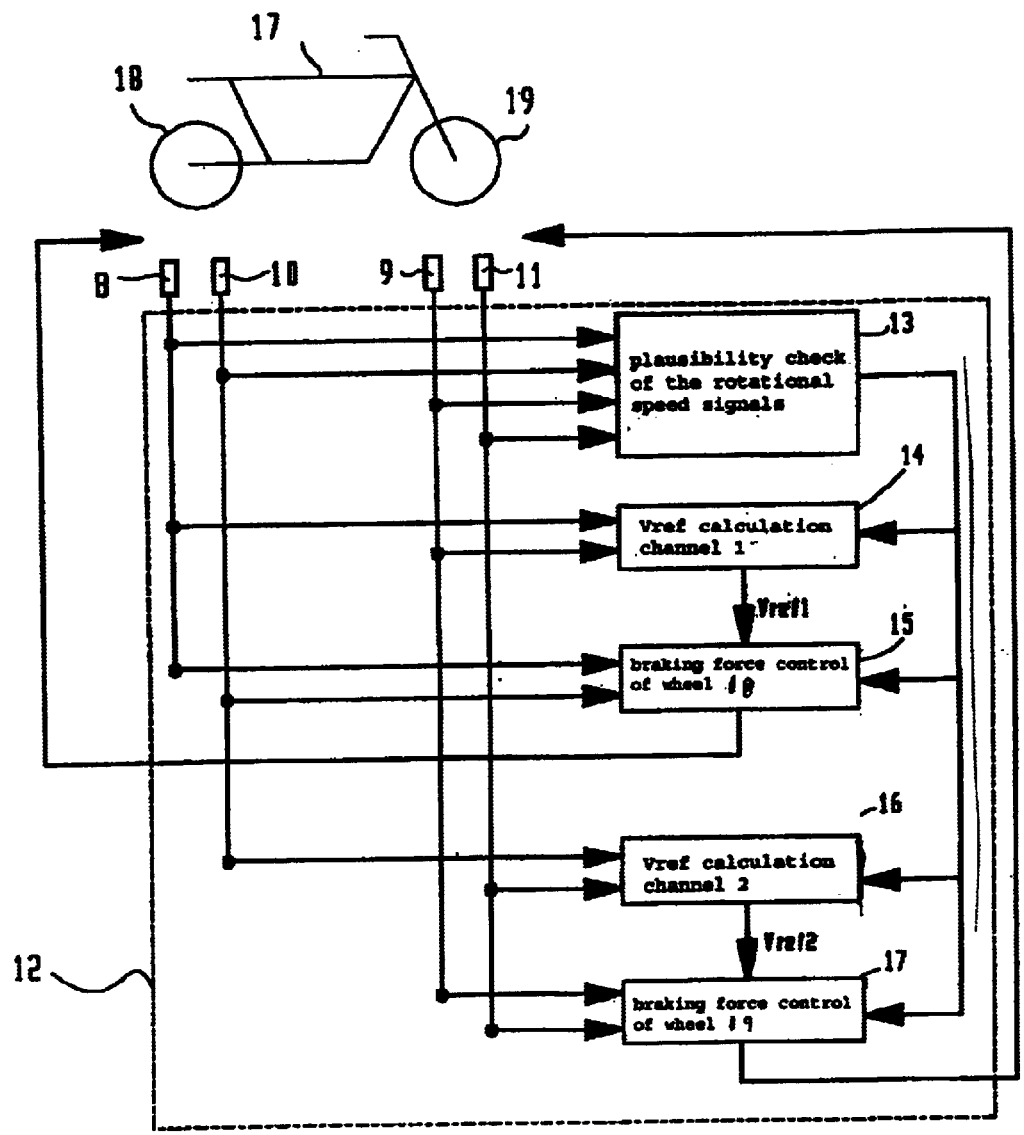
FIG. 2 is a schematic view of an embodiment of a use in the case of a motor bike.

FIG. 2 shows an embodiment in relation to a motor bike 70 having a rear wheel 18 and a front wheel 19. At the rear wheel 18, the two rotational wheel speed sensors 8, 10 are provided and, at the front wheel 19, the two rotational wheel speed sensors 9, 11 are provided to measure the speed of the front wheel or of the rear wheel. The rotational wheel speed sensors 8–11 are connected to the brake control unit 12 which is constructed analogous to FIG. 1. Analogous to FIG. 1, here also, two separate channels are provided, in which case a rotational wheel speed sensor 8, 9 and 10, 11 respectively is assigned to each channel. In the embodiment illustrated here, the rear wheel brake (not shown) is controlled by channel 1 and the front wheel brake is controlled by channel 2. The rotational wheel speed sensors 8, 10 and 9, 11 respectively may be integrated in a "double pulse generator" which is more cost-effective than two individual sensors.

Figure 3:
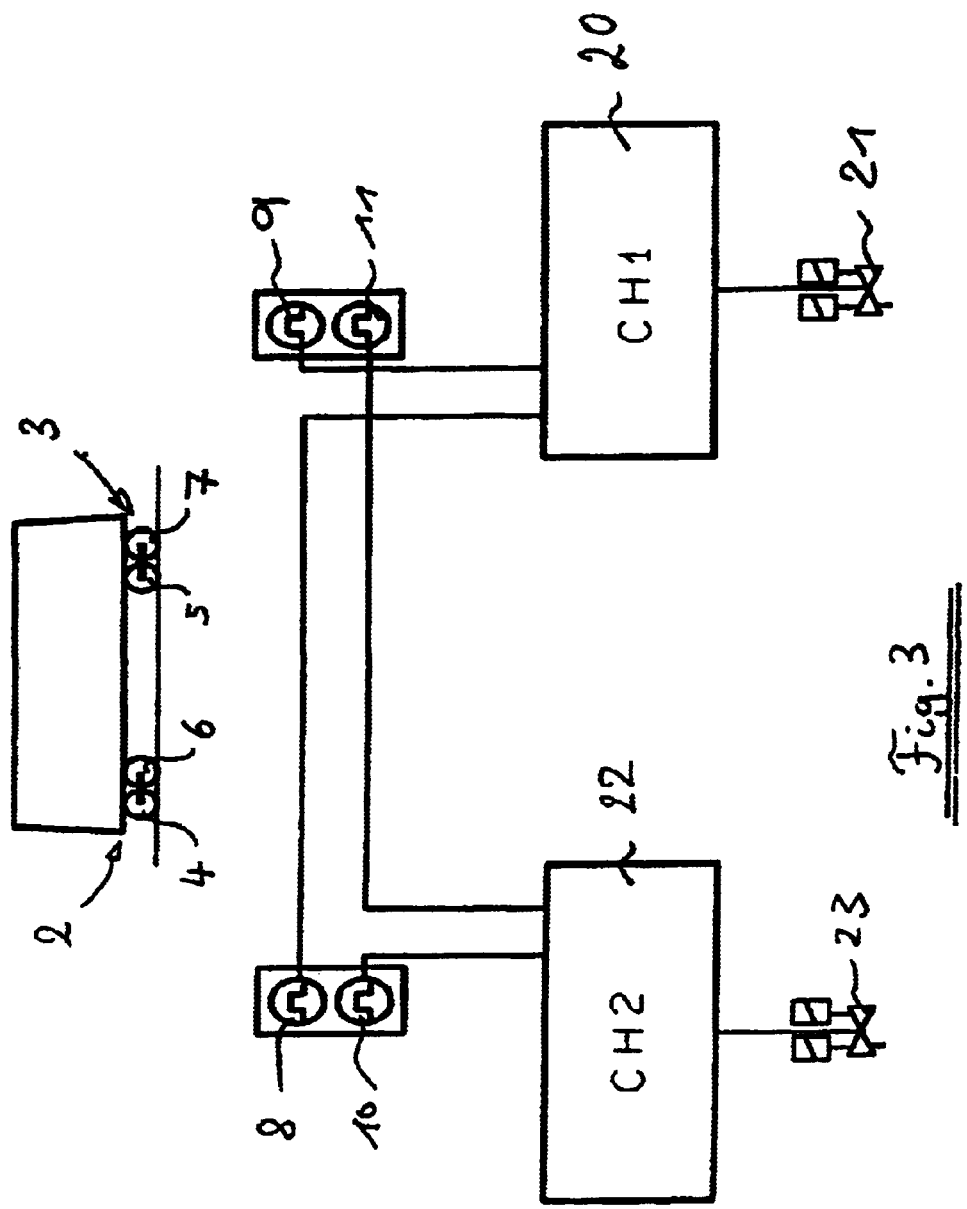
FIG. 3 is a schematic view of an embodiment similar to that of FIG. 1.

FIG. 3 shows an embodiment similar to that of FIG. 1, in which the axles 4, 6 of the first wheel group 2 and the axles 5, 7 of the second wheel group 3 are each kinematically coupled, for example, by way of a connecting rod or a gearing. The rotational wheel speed sensors 8–11 are in each case assigned to the axles 4, 6 and 5, 7 respectively. Analogous to the embodiment of FIG. 1, the rotational wheel speed sensors 8, 9 are assigned to a first channel 20 which is provided for controlling a first—here only schematically shown—group of brakes 21. Analogously thereto, the rotational wheel speed sensors 10, 11 are assigned to a second channel 22 which is provided for controlling a second brake group 23.

Although the two channels 20, 22 are shown as separate "units", they may, as illustrated in FIGS. 1 and 2, be formed by a common arithmetic unit.

Figure 4:
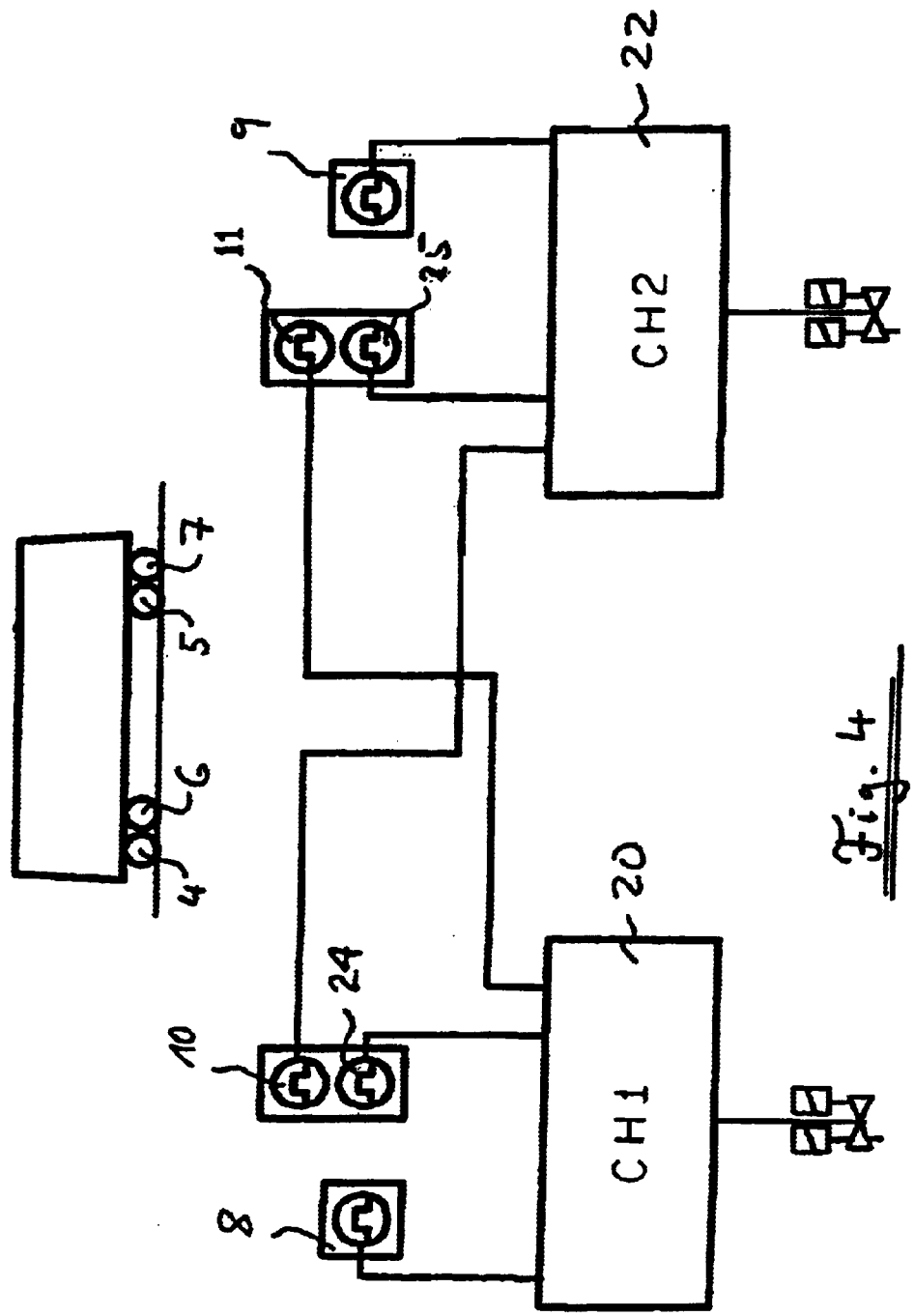
FIG. 4 is a schematic view of an embodiment of a four-axle vehicle with kinematically uncoupled axles.

FIG. 4 shows another embodiment of a four-axle vehicle. In contrast to the embodiment of FIG. 3, here, the axles 4 and 6 of the first wheel group or the axles 5 and 7 of the second wheel group are kinematically uncoupled from one another. One rotational wheel speed sensor 8, 9 respectively is provided on the axles 4 and 7. Two rotational wheel speed sensors 10, 11 and 24, 25 respectively are provided on the axles 5 and 6. The rotational wheel speed sensors 8, 11, 24 are assigned to the first channel 20, and the rotational wheel speed sensors 9, 10, 25 are assigned to the second channel 22, channel 20 taking over the brake control, for example, at the axles 4 and 6, and channel 22 taking over the brake control at the axles 5 and 7.

Figure 5:
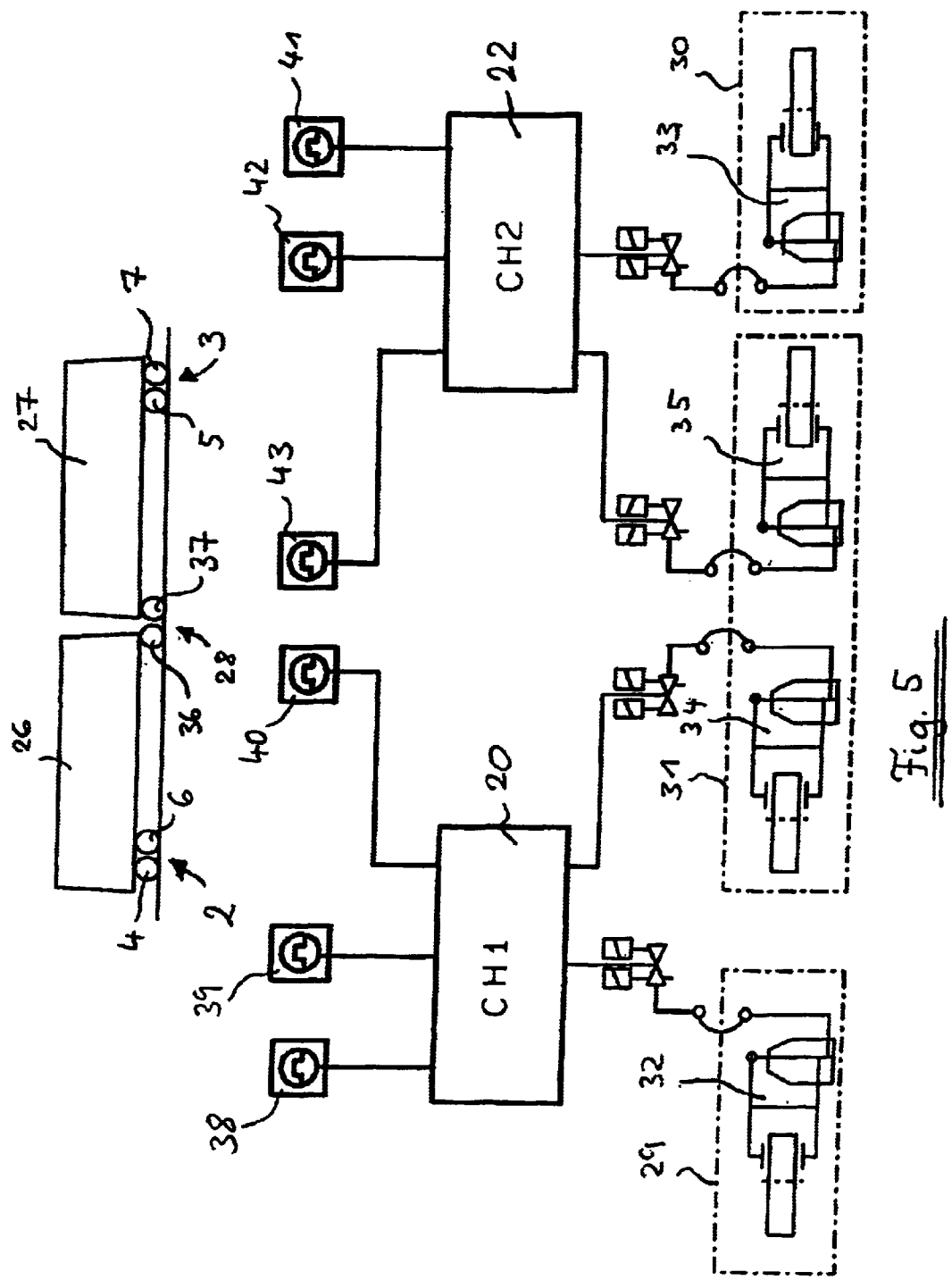
FIG. 5 is a schematic view of a first embodiment of a six-axle vehicle system.

FIG. 5 shows a embodiment for a six-axle vehicle which consists of two mutually coupled vehicle units 26, 27. A first wheel group 2 is assigned to vehicle unit 26, and a second wheel group 3 is assigned to vehicle unit 27. Furthermore, a "center" wheel group 28 is provided which is assigned to both vehicle units 26, 27. Wheel groups 2, 3, 28 are, for example, bogies of a rail vehicle to which one brake group 29–31 respectively is assigned. The brake groups 29, 30 each have one brake unit 32, 33, and the brake group 31 having two brake units 34, 35. Here, the term "brake unit" indicates an individual brake or a group of brakes which are controlled by a common brake pressure.

The brake units 32, 34 are controlled by the first channel 20, and the brake units 33, 35 are controlled by the second channel 22. Here, one rotational wheel speed sensor 38, 39 respectively of the axles 4, 6 as well as one rotational wheel speed sensor 40 of an axle 36 of the center wheel group 28 are assigned to the first channel 20. Rotational wheel speed sensors 41, 42 of the axles 5, 7 as well as a rotational wheel speed sensor 43 of an axle 37 of the center wheel group 28 are assigned to the second channel 22.

In the case of the embodiment illustrated in FIG. 5, the six axles 4–7, 36, 37 are not coupled kinematically. The brakes of the axles 36, 37 may be acted upon by different brake pressures. The brake control of the brake unit 34 takes place by way of the first channel, and the brake control of the brake unit 35 takes place by way of the second channel 22. The brake unit 32 is also controlled by the first channel 20, and the brake unit 33 is also controlled by the second channel 22.

Figure 6:
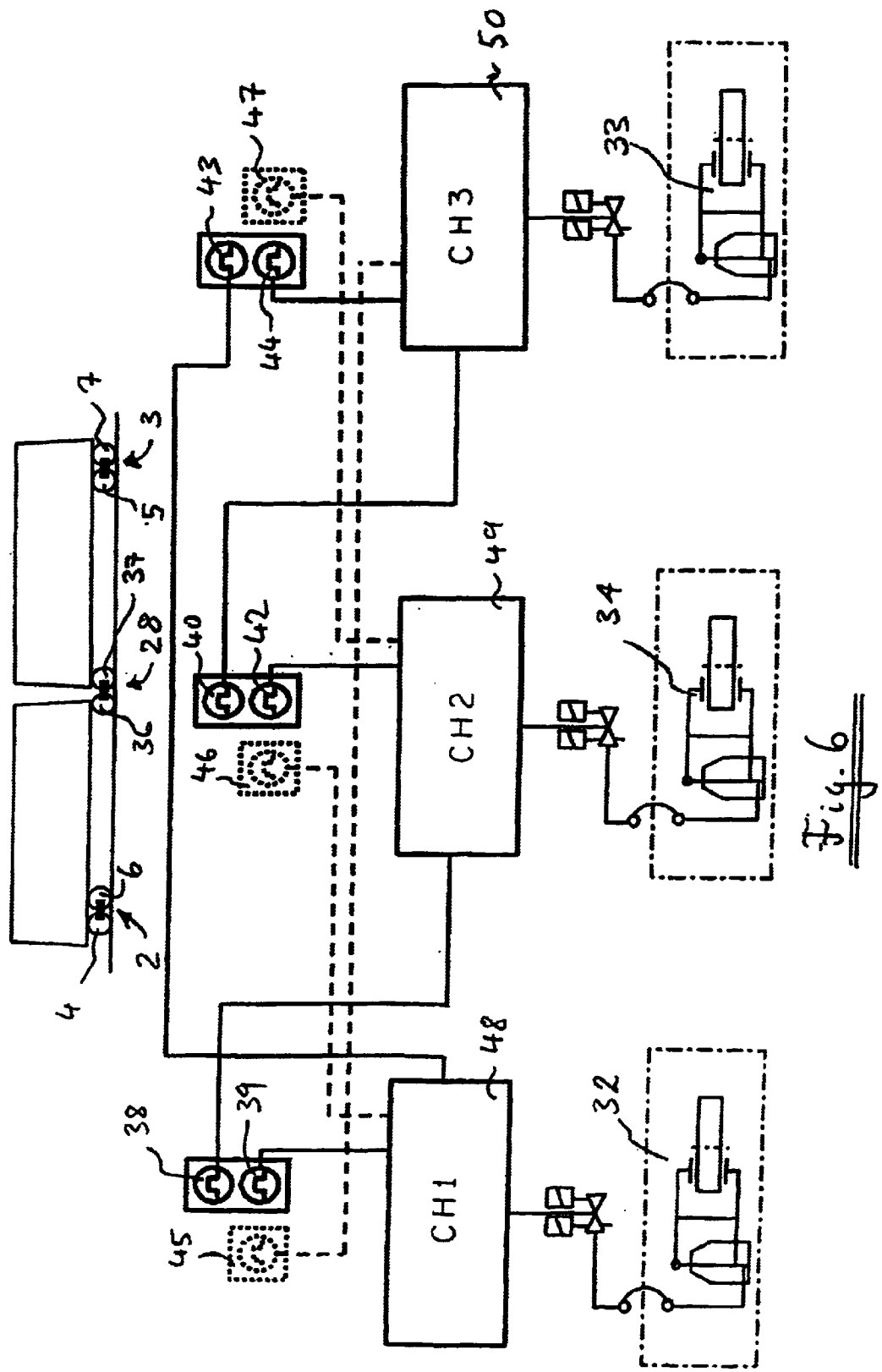
FIG. 6 is a schematic view of a second embodiment of a six-axle vehicle system.

FIG. 6 shows an embodiment of a six-axle vehicle, in which the individual axles of the wheel groups 2, 3, 28 are kinematically coupled, for example, by a transmission or a connecting rod. Two rotational wheel speed sensors 38–44 respectively are provided here on the axle 6 of wheel group 2, the axle 37 of wheel group 28 and on the axle 5 of wheel group 3. Furthermore, one additional rotational wheel speed sensor 45–47 respectively may be provided on the axles 4, 7, 36, which sensors 45–47 are indicated here by a broken line.

In contrast to the previous embodiments, three channels 48–50 are provided here in FIG. 6. The rotational wheel speed sensors 39, 43 and 46 are assigned to the first channel 48; the rotational wheel speed sensors 38, 42 and 47 are assigned to the second channel 49; and the rotational wheel speed sensors 40, 44 and 45 are assigned to the third channel 50. Since the individual axles of the wheel groups 2, 3, 28 are kinematically coupled, only three brake units 2, 33, 34 exist here. Brake unit 32 is controlled by the first channel 48; brake unit 34 is controlled by the second channel 49; and brake unit 33 is controlled by the third channel 50. In contrast to the embodiment of FIG. 5, here the individual brakes of the wheel groups 2, 3, 38 are each controlled by the same brake pressure.

Figure 7:
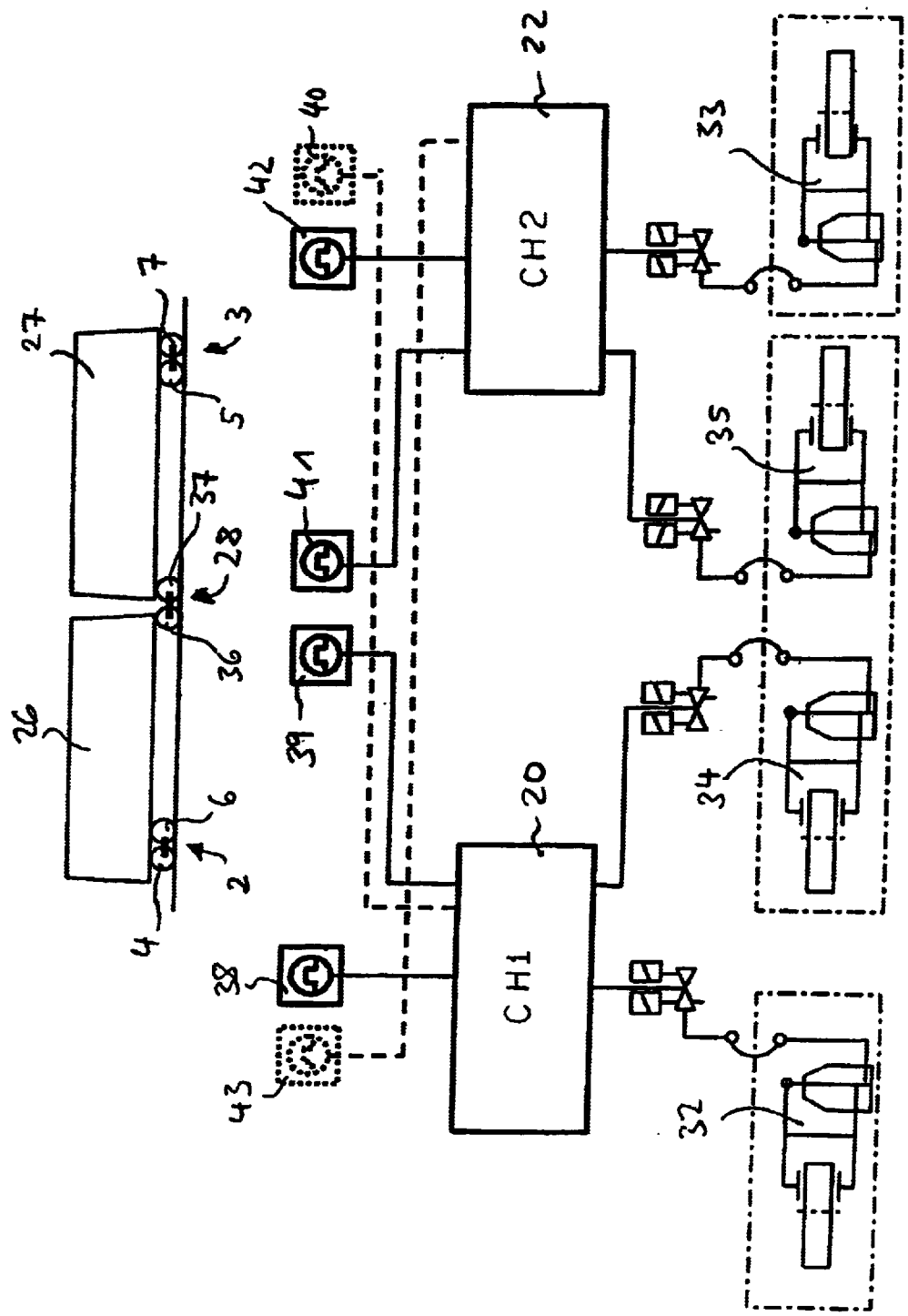
FIG. 7 is a schematic view of a third embodiment of a six-axle vehicle system.

FIG. 7 shows another embodiment for a six-axle vehicle, in which the axles of the wheel groups 2, 3 and 28 are kinematically coupled. In contrast to FIG. 6, only two channels 20, 22 are provided here. Channel 20 controls the brake units 32 and 34 of wheel groups 2 and 28 respectively; and channel 22 controls the brake units 33 and 35 respectively of the wheel groups 3 and 28 respectively. The rotational wheel speed sensors 38, 39 of axles 6 and 36 respectively are assigned to the first channel 20. In addition, a rotational wheel speed sensor 40 of the axle 7 may be assigned to channel 20. Two rotational wheel speed sensors of vehicle unit 26 and one rotational wheel speed sensor of vehicle unit 27 are then assigned to channel 20.

Analogously thereto, the rotational wheel speed sensor 41 of axle 37, the rotational wheel speed sensor 42 of axle 5, and optionally the rotational wheel speed sensor 43 of axle 4 are assigned to the second channel 22. The channel 22 therefore analyzes two rotational wheel speed signals of vehicle unit 27 and one rotational wheel speed signal of vehicle unit 26.

Figure 8:
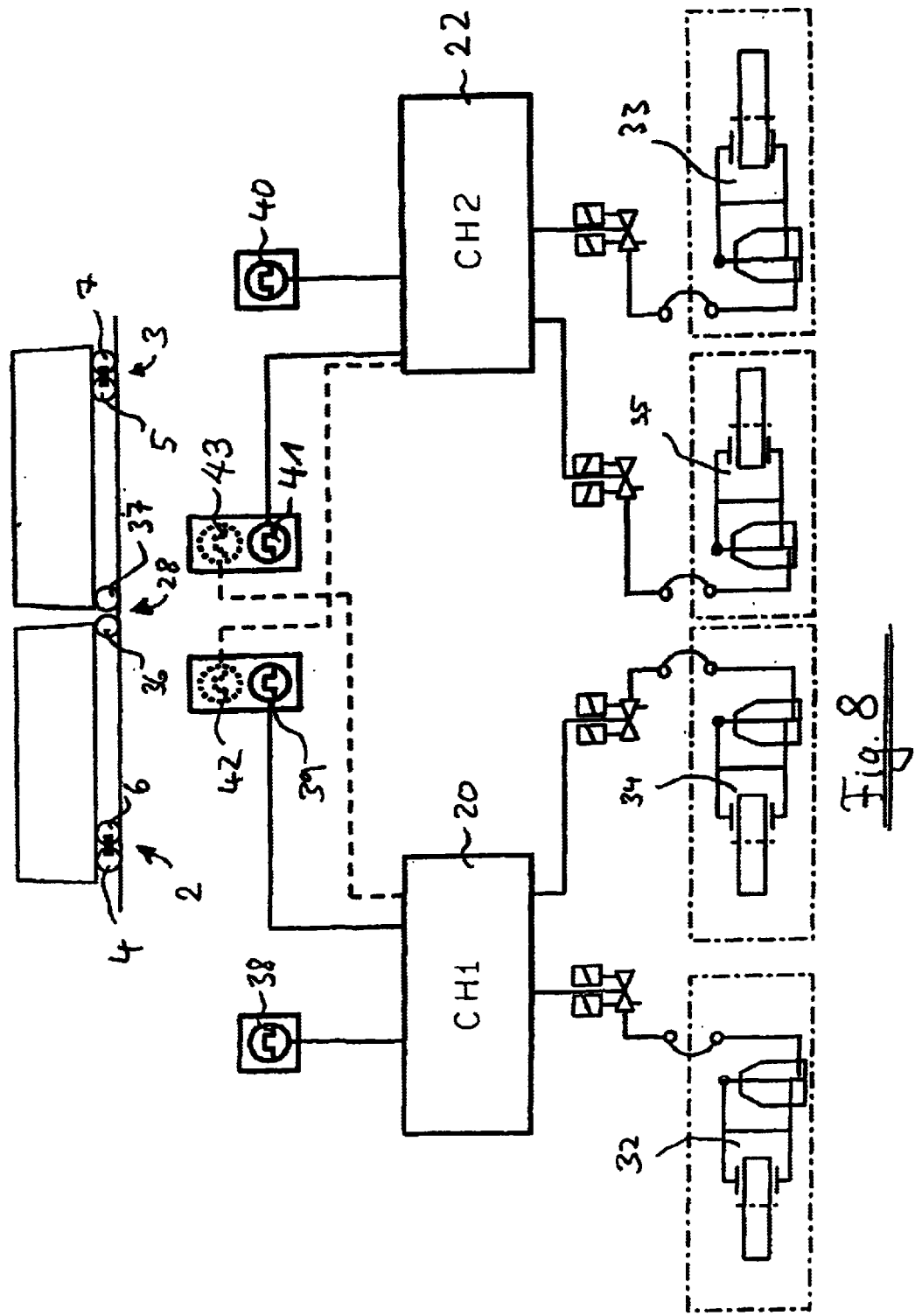
FIG. 8 is a schematic view of a fourth embodiment of a six-axle vehicle system.

FIG. 8 shows another embodiment for a six-axle vehicle. In this embodiment, the two axles 4, 6 of wheel group 2 and the axles 5, 7 of wheel group 3 are each kinematically coupled with one another. In contrast, the axles 36, 37 of the center wheel group 28 are not coupled kinematically. Correspondingly, the assigned brake units 34, 35 of the axles 36, 37 can be controlled by different brake pressures. The brake unit 34 is controlled together with the brake unit 32 of the wheel group 2 by the first channel 20; and the brake units 33, 35 are controlled by the second channel 22. Here, a rotational wheel speed sensor 38 of the wheel group 2 and the rotational wheel speed sensor 39 of the axle 36 are assigned to channel 20. Optionally, the rotational wheel speed sensor 43 of the axle 37 may be assigned to channel 20. Analogously thereto, a rotational wheel speed sensor 40 of the wheel group 3, a rotational wheel speed sensor 41 of the axle 37, and optionally, a rotational wheel speed sensor 42 of the axle 36 are assigned to the second channel 22.

In the embodiment illustrated in FIG. 8, two kinematically uncoupled axles and four axles which are in each case kinematically coupled in pairs are therefore provided, in which case the brakes of the center wheel group 28 can be acted upon by different brake pressures.

Figure 9:
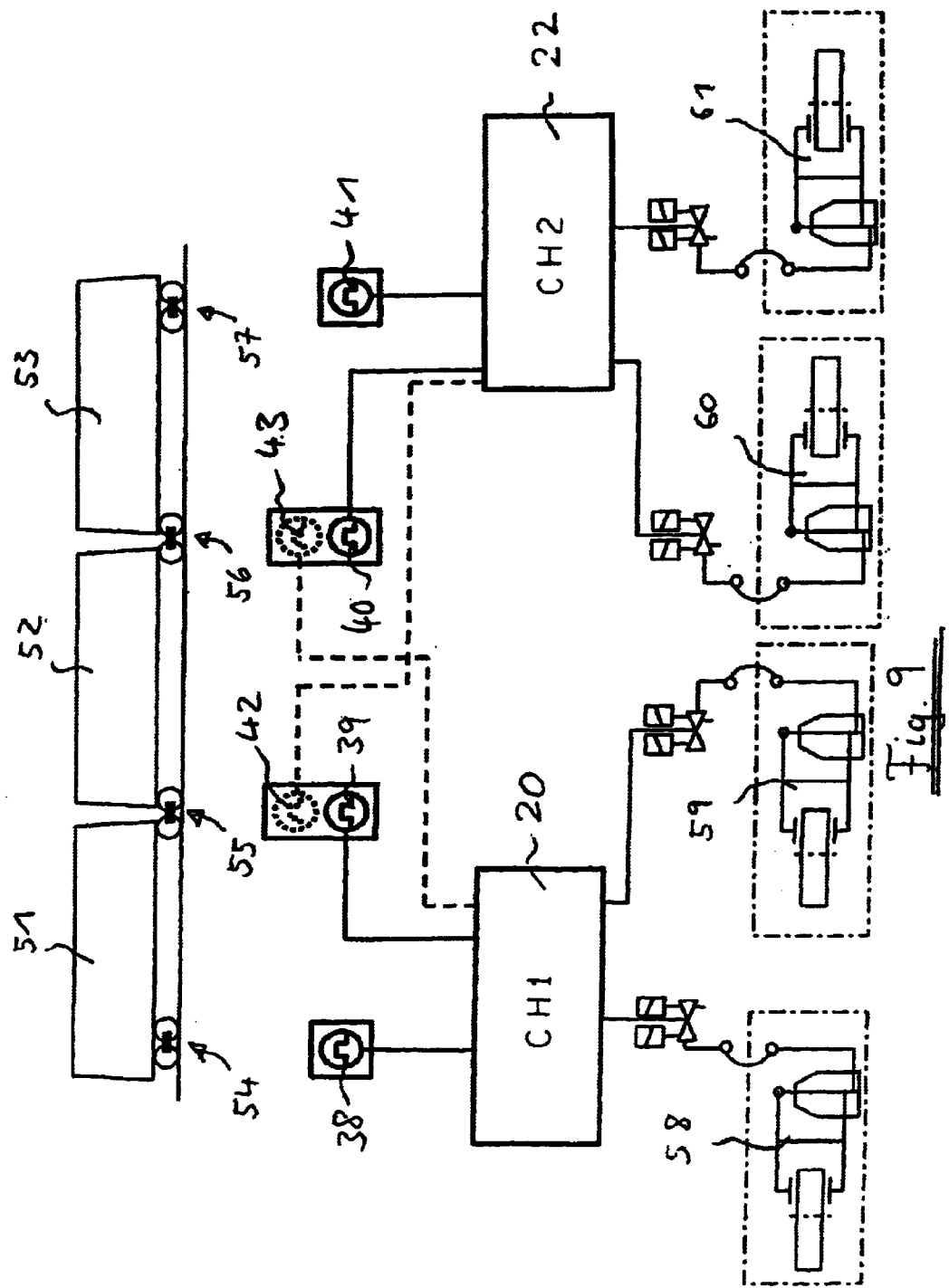
FIG. 9 is a schematic view of an embodiment of an eight-axle vehicle system.

FIG. 9 shows an eight-axle vehicle which consists of three vehicle units 51–53 and has four wheel groups 54–57. Each of the wheel groups consists of two axles which are each kinematically coupled with one another. Furthermore, at least one rotational wheel speed sensor 38–41 respectively is assigned to each wheel group 54–57. At wheel groups 55, 56, optionally a second rotational wheel speed sensor 42, 43 may in each case be provided. Here, the rotational wheel speed sensors 38, 39, 43 are assigned to the first channel 20, and the rotational wheel speed sensors 40, 41 and 42 are assigned to the second channel 22. The brakes of the wheel groups 54–57 form one brake unit 58–61 respectively. The brake units 58, 59 are controlled by the first channel 20, and the brake units 60, 61 are controlled by the second channel 22.

FIG. 10 shows an embodiment of a traction vehicle 62 which has four axles 4–7 which are kinematically coupled by way of a connecting rod 63. A rotational wheel speed sensor 8 of a first channel 20 is assigned to the two axles 4, 5, and a rotational wheel speed sensor 9 of a second channel 22 is assigned to the axles 6,7. Channel 20 controls the brakes of axles 4, 5, and channel 22 correspondingly controls the brakes of axles 6,7.

Although the present invention has been described and illustrated in detail, it is to be clearly understood that this is done by way of illustration and example only and is not to be taken by way of limitation. The scope of the present invention is to be limited only by the terms of the appended claims.

What is claimed is:

1. A braking system for vehicles equipped with an ABS system or an antiskid protection system, comprising:

rotational wheel speed sensors for sensing rotational wheel speed and providing rotational wheel speed signals;

an arithmetic unit which has at least two channels for the separate calculation of at least a first and a second reference speed approximating the actual vehicle speed from the rotational wheel speed signals and for generating control signals for antilock valves based on the reference speeds ($V_{ref1}$, $V_{ref2}$), a first portion of the antilock valves for a first group of wheels being assigned to a first channel, and a second portion of the antilock valves for a second group of wheels being assigned to a second channel;

at least first and second rotational wheel speed sensors for wheels of the first and second groups, respectively being assigned only to the first channel for the first reference speed calculation;

at least third and fourth rotational wheel speed sensors for wheels of the first and second groups respectively being assigned only to the second channel for the second reference speed calculations;

the first and third rotational wheel speed sensors being assigned to the first channel for generating control signals for the first portion of the antilock valves for the first group of wheels; and the second and fourth rotational wheel speed sensors being assigned to the second channel for generating control signals for the second portion of the antilock valves for the second group of wheels.

2. The braking system according to claim 1, wherein at least one rotational wheel speed sensor of a front axle and of a rear axle is assigned to each of the channels.

3. The braking system according to claim 2, wherein the arithmetic unit includes a control device for a plausibility check of the rotational wheel speed signals supplied by the rotational wheel speed sensors.

4. The braking system according to claim 1, wherein the arithmetic unit includes a control device for a plausibility check of the rotational wheel speed signals supplied by the rotational wheel speed sensors.

* * * * *